Nov. 29, 1966 C. E. GINGHER 3,288,308
CLOTHES HANGER SUSPENSION DEVICE
Filed Sept. 11, 1964 4 Sheets-Sheet 1
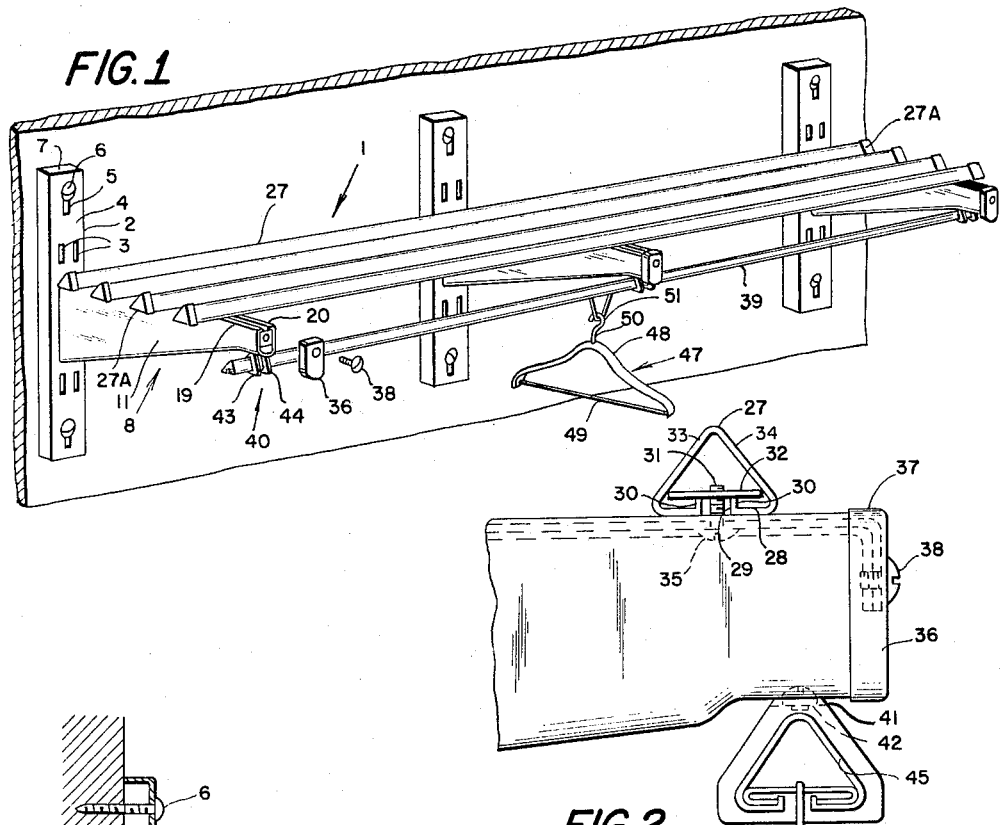
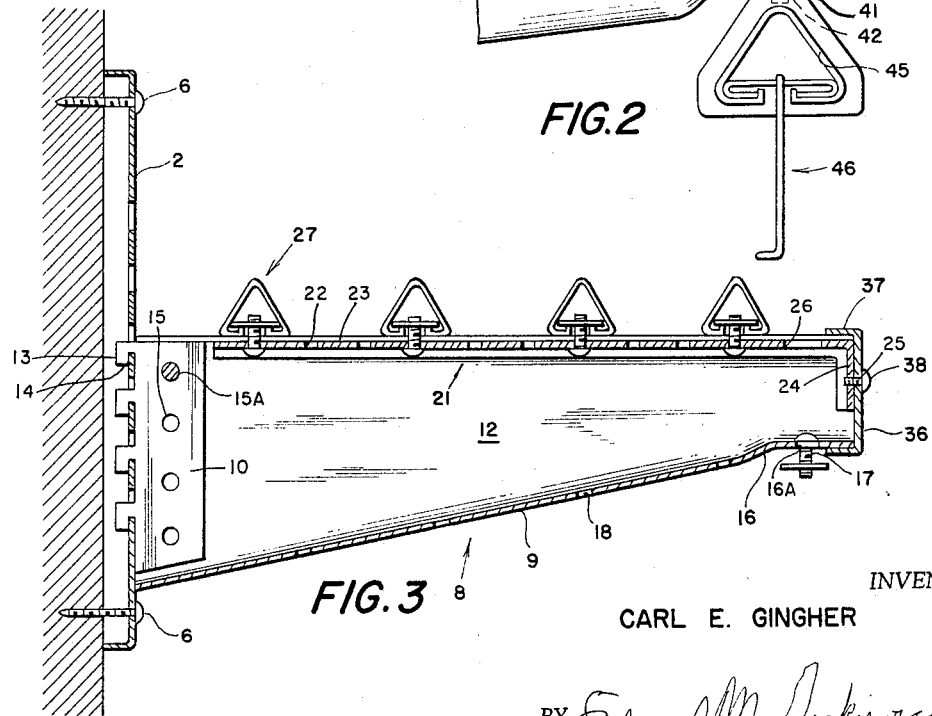
INVENTOR
CARL E. GINGHER
BY *Edmund M. Jaskiewicz*
ATTORNEY Nov. 29, 1966 C. E. GINGHER 3,288,308
CLOTHES HANGER SUSPENSION DEVICE
Filed Sept. 11, 1964 4 Sheets-Sheet 2

INVENTOR
CARL E. GINGHER

BY Edmund M. Jaskiewicz
ATTORNEY

INVENTOR
CARL E. GINGHER

Nov. 29, 1966     C. E. GINGHER     3,288,308
CLOTHES HANGER SUSPENSION DEVICE
Filed Sept. 11, 1964     4 Sheets-Sheet 4
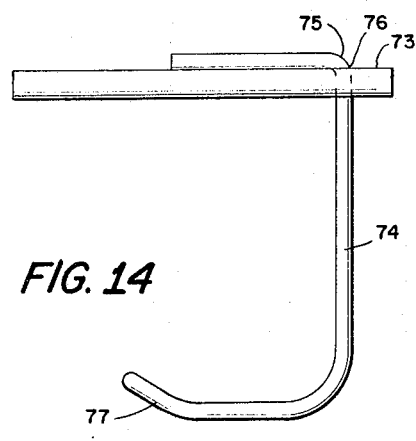
FIG. 14
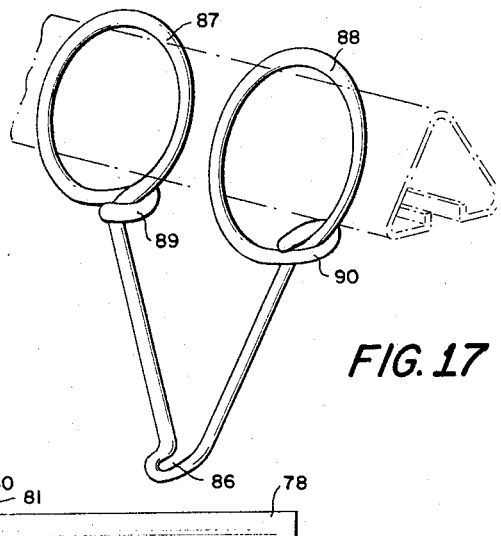
FIG. 17
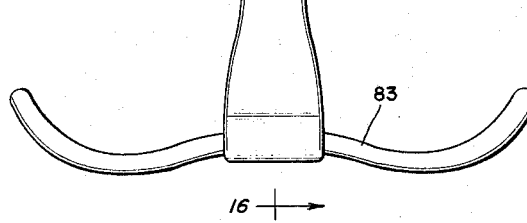
FIG. 15
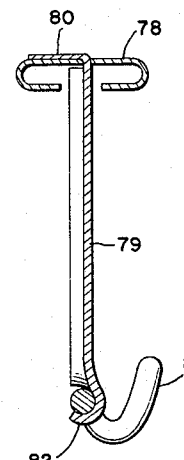
FIG. 16
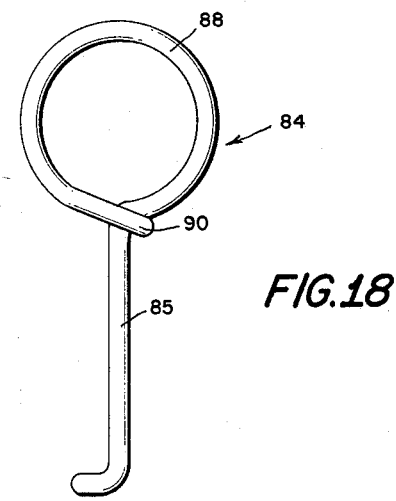
FIG. 18
INVENTOR
CARL E. GINGHER
BY *Edmund M. Jaskiewicz*
ATTORNEY

United States Patent Office 3,288,308
Patented Nov. 29, 1966

3,288,308
CLOTHES HANGER SUSPENSION DEVICE
Carl E. Gingher, Scranton, Pa.
(104 Gentilly Drive, Clark's Summit, Pa.)
Filed Sept. 11, 1964, Ser. No. 395,705
9 Claims. (Cl. 211—123)

The present invention relates to a wall mounted rack having shelves formed of spaced bars and an arrangement for hanging clothes hangers therefrom, more particularly, to a suspension device for clothes hangers which is slidably mounted in a track carried by the wall mounted rack.

In many types of buildings where large numbers of people gather, such as in schools, factories, industrial plants, offices and the like, it is desirable to provide a simple wall rack of great strength which has a shelf structure for supporting personal belongings and a suspension arrangement upon which garments, such as coats, may be hung. The basic function performed by such wall mounted racks are to support personal belongings and garments in an orderly manner. Thus, such a rack should have minimum inherent strength properties sufficient to perform these functions effectively. It has been found, however, that in many instances such wall-mounted racks have been badly damaged by persons who may grasp portions of the rack to swing on them or for other purposes. It has been particularly found that in the schools the younger people tend to use the racks to chin themselves in order to demonstrate to themselves and others their strength. Accordingly, such wall-mounted racks as were installed in schools required considerable expenses for maintaining them in proper condition and in many cases it was necessary to replace the racks completely after short periods of time.

Such wall racks are usually installed by mounting them upon a long wall surface such as in a corridor or one side of a large enclosed space as might be found in an industrial plant. When such racks were fixedly mounted upon the wall, they conformed to the variations of the wall surface from a vertical plane. In the construction of such building walls, the average run-out is only about ³⁄₁₆″. However, wall mounted racks would tend to magnify this run-out and when a person stood at one end of the racks and looked along the line of racks upon the surface of the wall, the deviations of the wall from the vertical were greatly magnified. As a result, construction of the building was unjustly criticized and in several instances, actually condemned. As fas as is known, no such wall-mounted racks comprising a shelf and a garment suspending structure have been constructed which are readily adjustable after the installation of the racks in order to compensate for any deviations in the wall surfaces and to align the racks.

Not only must such a wall-mounted rack be readily adjustable and have great strength but it should also be simple to assemble and install on site and should be relatively inexpensive.

For application on such wall-mounted racks and in other general applications, various arrangements have been devised for supporting clothes hangers. Clothes hangers are conventionally supported by a hook upstanding therefrom with the hook being positioned over a rod or bar. Where individual suspension devices for each clothes hanger are desired, the suspension devices have various forms of loops or openings formed thereon in order to receive the clothes hanger hook. Such suspension devices have also been constructed with specially formed receptacle portions to receive a particular type of a hanger means such as an enlarged or T-head on the end of a stem upstanding from a hanger. Thus, hangers with various types of hook or head arrangements thereon were not interchangeable between the various suspension devices but a particular type of suspension device would have to be provided for each type of hanger supporting arrangement.

It is the principal object of the present invention to provide a novel and improved clothes hanger suspension device.

It is another object of the present invention to provide a wall-mounted rack structure having a shelf formed of spaced bars and a garment suspending arrangement.

It is yet another object of the present invention to provide a clothes hanger suspension device which is slidably mounted in a track and which can receive clothes hangers having hanger hooks and the T-type and ball-type hanger hooks.

It is still another object of the present invention to provide a track structure for slidably carrying a clothes hanger suspension device which is of great strength and can be readily fabricated from relatively inexpensive material.

It is still a further object to provide a novel and improved clothes hanger suspension device for slidable movement in a track.

It is still an additional object of the present invention to provide a novel and improved arrangement of a track and a clothes hanger suspension device slidably carried therein.

The objects of the present invention are achieved and the disadvantages of the prior art are eliminated by the wall-mounted rack of the present invention. This rack essentially comprises a plurality of brackets which are mounted upon a wall and are vertically adjustable thereon. A supporting bracket is mounted on each wall bracket to support a plurality of spaced bars or rods which define a shelf. Slidably carried within the supporting brackets are adjusting slides to which the spaced bars are attached. The position of the slides may be varied with respect to the wall so as to adjust the distances of the bars from the wall but to maintain the bars in fixed spaced relationship to each other. Enclosing the ends of each supporting bracket is an end cap which is attached to the end of the adjustable slide within each supporting bracket.

The shelf bars comprise hollow tubular members which have a triangular cross-section and a longitudinally extending slot in one side thereof. The edges of the slot are bent inwardly toward the center of the rod to define a track upon which a clothes hanger suspension device may be slidably mounted. The use of the triangularly shaped rods to form the shelf results in a wall-mounted bar rack which is of tremendous strength. Tests have indicated that the wall rack of this invention is from 300% to 900% stronger than any similar racks currently on the market. This is an outstanding advantage since tests have shown that one of the leading causes of damage to such racks, particularly when installed in schools, is the use of such racks as chinning bars by students.

The use of such tubular members results in an overall lower material cost since it is not necessary to perform a seam welding operation on the shelf bars. It is therefore feasible to utilize heavier gauge steels to form these tubular members than would be the case if it were necesasry to seam-weld the shelf bars. It is estimated that even using heavier gauge steel but eliminating seam welding the wall rack of this invention can be sold for approximately two-thirds of the cost of any similar rack now on the market.

A clothes hanger bar which is similar to the tubular shelf rods may be mounted on the underside of the supporting brackets. Such a hanger bar may be mounted with the slotted slide upwardly so that clothes hanger hooks may be placed over the bar. When hooks are positioned over the hanger bar, they will be supported at two points, i.e., the edges of the top face of the triangular bar. Accordingly, the plurality of clothes hangers suspended on such a hanger bar will position themselves so that the hangers are all parallel to each other.

The triangular section hanger bar may also be attached to the ends of the supporting brackets by adapters so that the slotted face of the hanger bar is directed downwardly. In this position, clothes hanger suspension devices are slidably mounted within the triangular hanger bar. The base of the suspension device which is within the hanger bar is provided with a groove in the lower face thereof which groove receives the tracks defined by the upturned edges of the hanger bar slot.

The clothes hanger suspension device essentially comprises a rod-like member bent into the form of a V with the lower or apex end of the V being bent rearwardly at substantially right angles to the remainder of the V. This provides a universal suspension arrangement which can easily accomodate clothes hanger hooks or enlarged, T-shaped or ball heads on stems upstanding from clothes hangers. Thus, with the clothes hanger suspension device of this invention, it is not necessary to provide adapters to accommodate the different types of supports for clothes hangers which are on the market today.

Several modifications of the clothes hanger suspension device are also disclosed herein.

Other objects and advantages of the present invention will be apparent from the accompanying description when taken in conjunction with the following drawings, wherein:

FIGURE 1 is an overall perspective view of a wall-mounted rack incorporating the clothes hanger suspension device of the present invention;

FIGURE 2 is a side elevational view of the front portion of the rack of FIGURE 1;

FIGURE 3 is a vertical sectional view through a wall bracket and corresponding supporting bracket of the rack of FIGURE 1;

FIGURE 14 is a front elevational view of still another suspension device modification;

FIGURE 15 is a front elevational view of an additional suspension device modification;

FIGURE 16 is a sectional view taken along the lines 16—16 of FIGURE 15;

FIGURE 17 is a perspective view of the suspension device of the present invention modified so as to be slidably mounted upon a bar or rod; and FIGURE 18 is a side elevational view of the modified suspension device of FIGURE 17.

Proceeding next to the drawings wherein like reference symbols indicate the same parts throughout the various view, a specific embodiment of the present invention will be described in detail.

Figure 4:
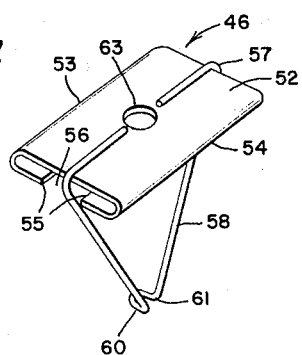
FIGURE 4 is an overall perspective view of a clothes hanger suspension device of the present invention.
Figure 5:
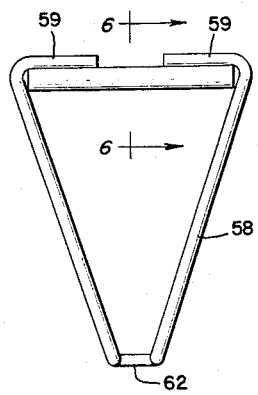
FIGURE 5 is a front elevational view of the suspension device shown in FIGURE 4.
Figure 6:
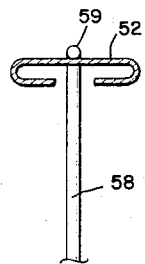
FIGURE 6 is a sectional view taken along the line 6—6 of FIGURE 5.

The wall-mounted bar rack of the present invention is indicated generally at 1 in FIGURE 1. The rack comprised a plurality of wall brackets 2 each of which has a channel cross section with a plurality of pairs of slots 3 in the web 4 thereof. In the ends of the bracket webs 4 are slots 5 through which are passed bolts 6 to secure the bracket to the wall. The slot and bolt arrangement 5 and 6 enables the wall brackets to be adjusted vertically on the wall. The ends of the channel wall bracket webs 4 are bent over at 7 so as to close the ends of the brackets. The brackets may be made in various lengths so as to accommodate a plurality of vertically spaced shelves or to mount the shelves at different heights with respect to the floor to accommodate increasing heights of growing children.

Mounted on each wall bracket is a supporting bracket indicated generally at 8 and illustrated in greater detail in FIGURE 3. The bracket 8 is formed of cold-rolled sheet steel which has an inherent resilience and is bent in substantially a U-shaped cross-section and in the shape of a right triangle. The bend which forms the lower end of the U-shaped cross-section comprises the hypotenuse of the triangle as indicated at 9. In forming of the bracket 8 the cross section of the bracket actually tapers outwardly from the bent side 9 so that the legs of the U-shape cross-section are not parallel to each other prior to assembly of the bracket.

A backing piece 10 is spot-welded to each inner face of the bracket sides 11 and 12 adjacent the long end thereof. There are a plurality of pairs of projections 13 extending outwardly from each of the backing pieces 10. Each projection has a notch 14 on the underside thereof adjacent the edge of the bracket and is of a width sufficient to accommodate the sheet steel from which the wall brackets 2 are formed. There are aligned openings 15 in the bracket sides 11 and 12 adjacent the shorter leg of the bracket. A nut and bolt assembly indicated at 15A in FIGURE 3 may be passed through this pair of aligned holes and tightened to urge the faces of the bracket together after the bracket has been mounted on the wall bracket 2 so as to lock the projections 13 of the supporting bracket within the slots of the wall bracket.

As may be seen in FIGURE 3 the underside of the forward end of the bracket 8 has a flattened portion 16 with an opening 16A therein to receive a bolt 17. There are a plurality of openings 18 spaced along the bend 9. The upper edges of the supporting bracket sides 11 and 12 are bent inwardly to form flanges 19 and 20.

Positioned within each supporting bracket 8 against the inner flanges 19 and 20 is an adjustable slide 21 as illustrated in FIGURE 3. The slide 21 has a channel cross-section with a plurality of spaced openings 22 in the web 23 thereof. The outer end of the channel is bent downwardly at right angles to form a bent portion 24 having a threaded opening 25 therein. There is a slot 26 in the web 23 adjacent the bent portion 24.

Supported on the upper edges of the supporting brackets 8 and attached to the adjustable slides therein are a plurality of spaced bars 27 which are parallel to the wall upon which the rack is mounted to define a shelf. The bars 27 are hollow and have a cross-section which defines an equilateral triangle. The open ends of the bars are closed by caps 27A tightly fitted thereon. One face 28 of the bar has a longitudinally extending slot 29 therein. The edges of the slot are bent inwardly at 30 so as to define a track. The bars 27 are formed from sheet steel of a suitable gauge with no seam welding being necessary in the fabrication of this bar. The resulting triangular bar with the slot therein has considerable strength. Even by using a somewhat heavier gauge sheet steel than would be employed in a seam welded bar the triangular bar of the present invention is considerably cheaper to make than would be the case if it were necessary to perform a seam welding operation on the bar.

The shelf bars 27 are secured to the upper edges of the supporting brackets 8 by flat head bolts 31 passed upwardly through selected openings 22 in the adjustable slide adapter 21 and extending into the slot 29 of a particular bar. An elongated nut or lug 32 is sufficiently long so that the ends thereof will engage the faces 33 and 34 of the bar whereby the nut is prevented from rotating within the bar. Access to the head 35 of the bolt 31 is provided by inserting a screw driver up through an opening 18 in the lower edge 9 of the supporting bracket.

An end cap 36 which has a flange 37 extending around its entire periphery fits closely over the forward open end of the supporting bracket. The end cap is secured to the bent end 24 of the slide 21 by a screw 38.

In the rack installation illustrated in FIGURE 1 there is mounted on the lower edge of the supporting brackets and adjacent the outer end thereof a hanger bar 39 with its slotted face positioned downwardly. To mount the hanger bar in this position there is provided an adapter 40 which may be seen in FIGURE 2. The adapter 40 has a base portion 41 which is of considerable thickness so as to have a threaded opening 42 therein. Depending from opposed sides of the base 41 are legs 43 and 44 each of which has a triangular opening 45 therein to conform to the shape of the triangular bar 27 so that such a bar may be snugly received therein.

The adapter 40 is secured to the flattened portion 16 on the forward end of the supporting bracket 8 by positioning the base 41 of the adapter against the flattened portion 16 and threading a bolt 17 downwardly through the opening 16A, into threaded engagement with the adapter opening 42. Access to the head of the bolt 17 may be through the slot 26 in the slide 21 or, in the absence of the slide, between the flanges 19 and 20 on the upper edge of the supporting bracket.

With the adapters 40 in position, a hanger bar 39 may then be placed therein as may be seen in FIGURES 1 and 2 of the drawings.

As may be seen in FIGURE 1 the hanger bar 39 is utilized as a track in which are slidably carried a plurality of clothes hangers suspension devices 46 as illustrated in FIGURES 2 and 4.

Each suspension device 46 may have suspended therefrom a clothes hanger indicated generally at 47 and comprising a curved shoulder bar 48 having a cross bar 49 secured between the ends thereof. Upstanding from the mid-portion of the shoulder bar 48 is a shank or stem 50 having a hook 51 extending therefrom. The hook functions as the support means for the clothes hanger.

Figure 9:
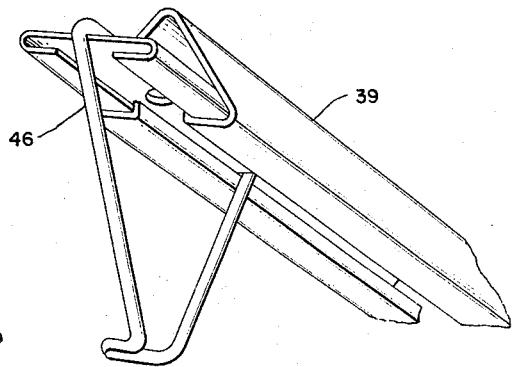
FIGURE 9 is a perspective view looking upwardly at the track of FIGURE 8 and further showing a suspension device positioned thereon.

The operating relationship between the suspension device 46 and the track 39 is clearly illustrated in FIGURE 9.

The suspension device 46 comprises a base 52 formed of a rectangular piece of metal with opposed edges thereof being bent inwardly at 53 and 54 to form spaced apart channels with the terminal edges 55 of the channels defining therebetween a slot 56. The slot 56 receives the track portions 30 of the bar 27.

To form the support for the hanger a single rodlike member 57 is bent to form a V portion 58 with the ends of the rod 59 being bent over into engagement with the top surface of the base 52 and welded thereto. The end or apex 60 of the V is curved and then bent rearwardly at 61 at a right angle to the V portion 58 to define a slot 62. The V portion 58 is substantially at right angles to the base 52. An opening 63 is formed within the base 52 to accommodate a locking nut if it is desired that the suspension device 46 be locked in position within the hanger bar 39.

As may be best seen in FIGURE 2 the presence of the slidable suspension device 46 within the hanger bar 39 adds considerable strength to the bar. The edges 53 and 54 of the suspension device base 46 engage the inner faces of the triangular bar and thus prevent the triangular bar from closing so as to narrow the slot 29 therein. In addition, the terminal edges 55 of the suspension device base 46 engage the flanges 30 of the triangular bar slot 29 so as to prevent opening or spreading of this slot.

Figure 7B:
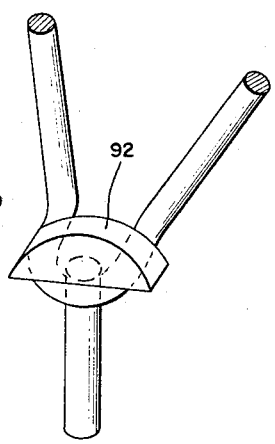
FIGURES 7A and 7B show a ball head and T-head on stems of a clothes hanger positioned in the suspension device of FIGURE 4.
Figure 7A:
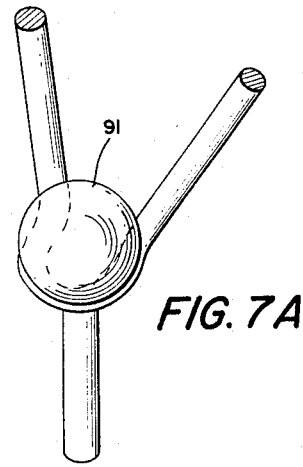

In FIGURE 7A and 7B there is illustrated the manner in which a ball head support 91 of a clothes hanger and the T type head 92 are supported within the suspension device of the present invention. The ball type and T type heads are usually used on clothes hangers to prevent the use of such hangers except on special adapters attached permanently on hanger bars. In either event the wide V shaped portion 58 facilitates insertion of either the hanger hook or the ball or T heads into the slot 62 at the apex of the suspension device 46.

It is pointed out that the suspension device 46 of the present invention has the slot 62 in the apex facing to the front of the rack so that the person desiring to position a clothes hanger on the suspension device has full visibility of the suspension device. This is a great advantage when compared with previous suspension devices wherein access to the slotted opening was from the sides and, accordingly, difficulty was encountered in either positioning or removing a clothes hanger from such prior art suspension devices, particularly when many garments were closely packed upon suspension devices. Further, while the slot 62 in the apex of the suspension device is only slightly wider than the diameter of the stem upstanding from the clothes hanger, the V-shaped portion 58 forms a guide to the slot to facilitate the hanging of clothes hangers thereon. Thus while the actual supporting of the hanger hook is in the narrow slot 62 in the apex, positioning of the hanger hook is considerably facilitated by the V portion 58 which guides the hook to the slot 62.

Figure 10:
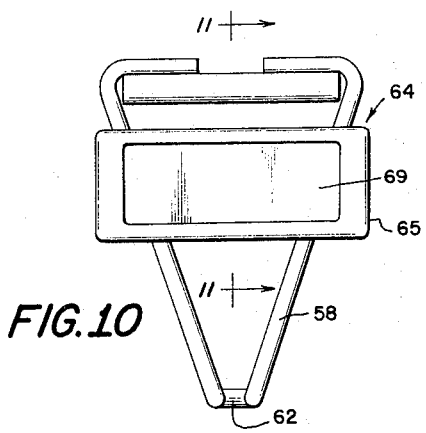
FIGURE 10 is a front elevational view of a suspension device similar to that of FIGURE 4, but having a holder thereon for identification cards or numbers.
Figure 11:
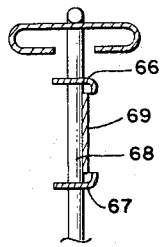
FIGURE 11 is a sectional view taken along the line 11—11 of FIGURE 10.

In FIGURES 10 and 11, there is shown a modification wherein the suspension device of FIGURE 4 is provided with an identification holder indicated generally at 64. The holder comprises a frame 65 which is welded onto the front of the V-shaped portion 58. The frame 65 has top and bottom flanges 66 and 67 which are provided with slots therein to receive the legs defining the V-portion 58. A recess portion 68 is spaced behind the front face of the frame 65 to accommodate identification cards 69. The identification cards may be a number of small cards, as indicated in FIGURE 10, with each having a numeral thereon or may comprise a single large card bearing a name or some other form of identification. The holder 64 enables the identification means to be interchanged or removed as may be desired. It is pointed out that the frame 65 of the identification holder is substantially the same length as the width of the suspension device as can be seen in FIGURE 10. Accordingly, when a plurality of suspension devices are positioned adjacent each other in the track, the identification holders 64 will be in alignment and will present a continuous line.

Figure 13:
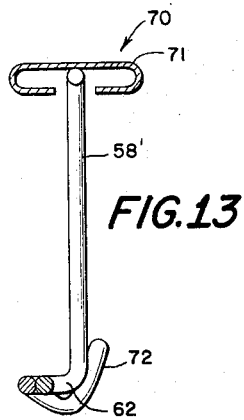
FIGURE 13 is a side elevational view of the suspension device modification shown in FIGURE 12.
Figure 12:
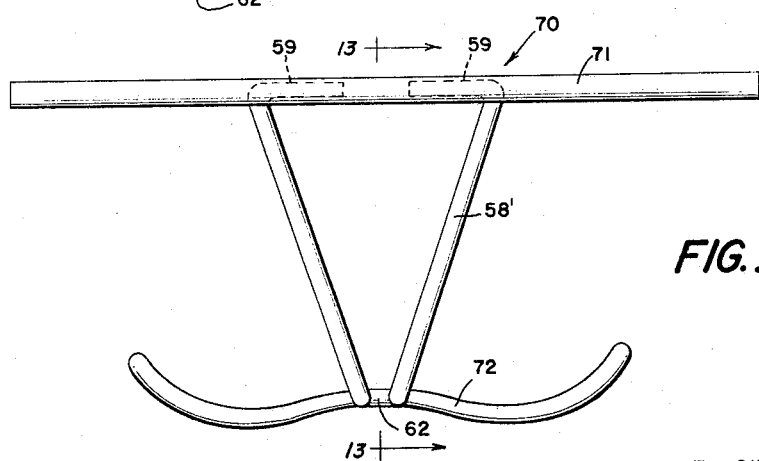
FIGURE 12 is a front elevational view of another modification of the suspension device.

Proceeding next to FIGURES 12 and 13, there is shown another modified suspension device having both a V guide and slot for clothes hangers and a double hook for garments. This modified suspension device indicated generally at 70 comprises a base 71 which has the same cross section as the base 52 of the suspension device of FIGURE 4 but is somewhat longer. Accordingly, the ends 59 of the V-shaped portion 58' are spot-welded to the inner face of the base 71 as may be seen in FIGURE 13. The increased length of the base is necessary since the suspension device may support a coat on only one side and hence be considerably out of balance. On the tip of the apex 60 there is spot-welded a double coat hook indicated at 72. Thus, not only can this modification support clothes hangers having different types of supporting members but can also carry two or more garments on the ends of the double coat hook.

In a further modification of FIGURE 14, the base indicated at 73 has the same cross-section as the base 52 of the suspension device of FIGURE 4, but is made slightly longer. A single coat hook is formed from a wire or rod 74 with the upper end being bent at 75 at substantially right angles after being passed through an opening 76 in the base. The upper end is then spot-welded to the top surface of the base 73. The lower end of the rod 74 is bent to form a garment hook 77.

Figure 8:
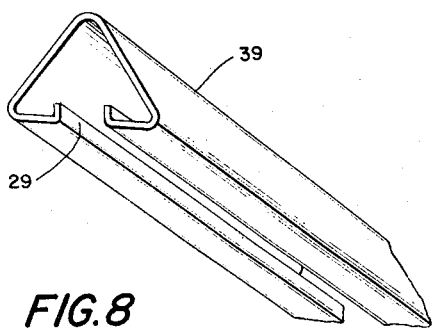
FIGURE 8 is a perspective view looking upwardly at a triangular tubular member track in the wall mounted rack of FIGURE 1.

Proceeding next to FIGURES 15 and 16, there is shown still another modification of the suspension device which is provided with a double coat hook. This modification similarly comprises a base 78 which is similar to the base 71 of the modification of FIGURE 12. Projecting downwardly from the base 78 is an arm 79 having a channel cross-section with one end 80 being inserted through an opening 81 in the base 78 and bent over as shown in FIGURE 16 to be welded to the upper surface of the base 78. The lower end 82 of the bracket 79 is bent around a double coat hook 83 and welded thereto. Thus, this modified suspension device can be utilized with the track of FIGURE 8 but is not provided with a V-shaped holder for a clothes hanger hook.

In FIGURES 17 and 18 there is provided another modified form of suspension device which can be slidably mounted on any shape of hanger bar. This suspension device is indicated generally at 84 and comprises a V-shaped portion 85 which is similar to the V-shaped portion 58 of the suspension device of FIGURE 4. The apex of the V-shaped portion 85 is similarly shaped to define a slot 86 for receiving a clothes hanger supporting member.

The upper ends of the legs of the V-shaped portion 85 are formed into circular loops 87 and 88 with the extreme portions of the rods being bent around the upper ends of the V-shaped portions as indicated at 89 and 90. The suspension device 84 is thus similar to the suspension device 46 of FIGURE 4 but it can be slidably mounted upon hanger bars having circular, square, triangular or other cross-sections. Thus, this suspension device 84 is truly universal since it not only can support every known type of hanger supporting member but can also be slidably mounted upon various shaped bars. The loops 87 and 88 can be made into any desired size so as to accommodate various diameters of hanger bars.

In the installation of the wall rack of the present invention the wall brackets 2 are first mounted by the screws 6 on the wall in their approximate vertical positions. The slot 5 in which the screw 6 is received provides for a subsequent fine vertical adjustment of the wall brackets to insure that the bars 27 which define the shelf of the rack are substantially horizontal.

The spacing of the bars 27 with respect to each other and the distances of these bars from the wall is determined by selecting the openings 22 in the slide through which the bolts 31 are passed. When the bars 27 are mounted upon the slide the slide may then be positioned within the supporting brackets by slidable movement therein perpendicularly to the wall.

The end cap 36 is telescopingly positioned over the open end of the supporting bracket and positioned by screwing bolt 38. Thus these end caps remain in the same relative position with the shelf bars 27 so that when the racks are sighted linearly they all appear to be in alignment, particularly the outermost portions thereof which are the caps 36.

Thus, it can be seen that the present invention discloses a track and a slidably carried suspension device which can take any type of hanger on the market today, including the common hook, the ball-type head and the T-type head where the latter two are usually used on hangers to prevent their use except on special adapters attached permanently on hanger bars. Not only can this suspension device support any type of clothes hanger, but the suspension device may be slidably mounted in a track or slidably mounted upon a hanger bar.

Various modifications of this suspension device provide for ready identification of garments suspended thereon or for the addition of hooks for supporting additional garments. The garment suspension arrangement disclosed herein may be used in connection with a wall-mounted rack or the track may be mounted by itself.

It will be understood that this invention is susceptible to modification in order to adapt it to different usages and conditions and accordingly, it is desired to comprehend such modifications within this invention as may fall within the scope of the appended claims.

What is claimed is:

1. A clothes hanger suspension device for slidable movement in a track, and comprising a rectangularly shaped base with the opposed longer edges being bent inwardly to form spaced apart channels with the terminal edges of said channels adapted to being slidably received in a track, a V-shaped rod with the ends thereof being attached to said base between said opposed longer edges and said V-shaped rod being at right angles to said base, the apex of said V-shaped rod being bent at right angles to said rod to define a short slot so that a clothes hanger having a suspension member including one of a hook, a T and an enlargement on the end of a stem can be suspended from said slot.

2. A clothes hanger suspension device for slidable movement in a track, and comprising a rectangularly shaped base with the opposed longer edges being bent inwardly to form spaced apart channels with the terminal edges of said channels adapted to being slidably received in a track, a V-shaped rod with the ends thereof being attached to said base between said opposed longer edges and said V-shaped rod being at right angles to said base, the apex of said V-shaped rod being bent at right angles to said rod to define a short slot so that a clothes hanger having a suspension member including one of a hook, a T and an enlargement on the end of a stem can be suspended from said slot, and an identification card holder mounted on said V-shaped rod between said base and said apex.

3. A clothes hanger suspension device for slidable movement in a track, and comprising a rectangularly shaped base with the opposed longer edges adapted to being slidably received in a track, a V-shaped rod with the ends thereof being attached to said base between said opposed longer edges and said V-shaped rod being at right angles to said base, the apex of said V-shaped rod being bent rearwardly at right angles to said rod to define a slot so that a clothes hanger having a suspension member including a hook, a T and an enlargement on the end of a stem can be suspended from said slot, and a horizontally extending rod-like member having its central portion attached to said apex and the ends thereof curved upwardly for the hanging of garments thereon.

4. A clothes hanger suspension device for slidable movement in a track, and comprising a rectangularly shaped base with the opposed longer edges being bent inwardly to define a groove adapted to being slidably received in a track, there being a slot in said base, a channel section supporting member having a web and side flanges with one end of said webs inserted through said base slot and bent over to be secured to the upper face of said base between said opposed longer edges, said supporting member extending from said groove at right angles from said base, the other end of the web of said channel supporting member being bent into a loop toward the flanges of the supporting member and a horizontally extending rod-like member having its central portion bowed upwardly and fastened within said end loop of said supporting member, the ends of said rod-like member being curved upwardly and away from said end loop for hanging of garments thereon.

5. A clothes hanger suspension device comprising a pair of spaced coaxial loops adapted to be slidably mounted on a horizontally extending rod, a V-shaped rod with the ends thereof being attached to the lowermost portions of said loops, the apex of said V-shaped rod being bent at right angles to said rod to define a slot so that a clothes hanger having a suspension member including one of a hook, a T and an enlargement on the end of a stem can be suspended from said slot.

6. A clothes hanger suspension device comprising a strip of wire bent in a V with the end of said V being further bent into spaced coaxial circles in planes at right angles to the plane defined by said V with said circles being adapted to be slidably mounted on a horizontally extending rod, the extremities of said wire being attached to the ends of said V, the apex of said V-shaped rod being bent at right angles to said rod to define a slot so that the clothes hanger having a suspension member including one of a hook, a T and an enlargement on the end of a stem can be suspended from said slot.

7. A garment suspension arrangement comprising a tubular member having a cross section defining a triangle with one face thereof being directed downwardly, there being a longitudinally extending slot in said one face of said tubular member with the edges of said slot being bent inwardly at substantially right angles to said one face to define a track, a base slidably carried within said tubular member and comprising a rectangular member having its longitudinal edges curved and bent inwardly to form spaced apart channels with the terminal edges of said channels receiving therebetween said tubular member track, and means attached to said base and extending outwardly therefrom through said tubular member slot for supporting a garment.

8. A garment suspension arrangement as claimed in claim 7 with the transverse edges of said base being slightly less than the inner width of said slotted face so that said base slides freely within said tubular member but vertical movement of said base is limited by the other two converging faces of said tubular member to maintain said base upon said track.

9. A garment suspension arrangement comprising a tubular member having a triangular cross section with one face thereof being directed downwardly, there being a longitudinally extending slot in said one face of said tubular member with the edges of said slot being bent inwardly at substantially right angles to said one face to define a track, a base slidably carried within said tubular member and comprising a rectangular member having its longitudinal edges curled and bent inwardly to form spaced channels with the terminal edges of said channels receiving therebetween said tubular track, a rod bent into a V with the ends thereof attached to said base between said longitudinal edges and extending outwardly through said tubular member slot at substantially right angles to said face to define a V-guide, the apex of said V-shaped rod being bent rearwardly at right angles to said rod to define a slot so that a clothes hanger having a suspension member including one of a hook, a T and an enlargement on the end of a stem can be suspended from said slot.

References Cited by the Examiner

UNITED STATES PATENTS

| | | | |
|---|---|---|---|
| 290,735 | 12/1883 | Broome | 211—94 |
| 1,329,889 | 2/1920 | Edsall et al. | 16—87.4 |
| 1,462,803 | 7/1923 | Deserty | 211—123 |
| 1,791,682 | 2/1931 | Morrison et al. | 40—10 |
| 1,844,096 | 2/1932 | Levene | 248—307 |
| 2,248,916 | 7/1941 | Opper | 211—60 |
| 2,451,110 | 10/1948 | Newman | 211—94 |
| 2,782,846 | 2/1957 | Bussard | 160—84 |
| 3,158,113 | 11/1964 | Johnson | 108—64 |

FOREIGN PATENTS

| | | |
|---|---|---|
| 678,963 | 1/1930 | France. |
| 1,030,537 | 12/1952 | Germany. |
| 597,085 | 1/1948 | Great Britain. |

CLAUDE A. LE ROY, *Primary Examiner.*

CHANCELLOR E. HARRIS, *Examiner.*

W. D. LOULAN, *Assistant Examiner.*